United States Patent
Oda (10) Patent No.: US 9,849,614 B2
(45) Date of Patent: Dec. 26, 2017

(54) PRODUCTION METHOD OF PRODUCING FIBER-REINFORCED RESIN MOLDING

(71) Applicant: TOYOTA JIDOSHA KABUSHIKI KAISHA, Toyota-shi, Aichi-ken (JP)

(72) Inventor: Tetsuya Oda, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 135 days.

(21) Appl. No.: 14/861,165

(22) Filed: Sep. 22, 2015

(65) Prior Publication Data

US 2016/0089822 A1    Mar. 31, 2016

(30) Foreign Application Priority Data

Sep. 25, 2014    (JP) .................................. 2014-195830

(51) Int. Cl.

| B29C 45/18 | (2006.01) |
|---|---|
| B29C 45/00 | (2006.01) |
| B29C 47/00 | (2006.01) |
| B29C 47/10 | (2006.01) |
| B29C 47/76 | (2006.01) |
| B29K 105/12 | (2006.01) |
| B29K 101/12 | (2006.01) |
| B29K 307/04 | (2006.01) |
| B29C 43/00 | (2006.01) |
| B29C 43/34 | (2006.01) |
| B29K 267/00 | (2006.01) |
| B29K 305/00 | (2006.01) |
| B29K 309/02 | (2006.01) |

(Continued)

(52) U.S. Cl.
CPC ...... *B29C 45/0005* (2013.01); *B29C 45/1816* (2013.01); *B29C 47/0004* (2013.01); *B29C 47/1027* (2013.01); *B29C 47/1045* (2013.01); *B29C 47/1081* (2013.01); *B29C 47/767* (2013.01); *B29C 43/003* (2013.01); *B29C 43/34* (2013.01); *B29C 2043/3411* (2013.01); *B29K 2101/12* (2013.01); *B29K 2105/12* (2013.01); *B29K 2267/00* (2013.01); *B29K 2277/00* (2013.01); *B29K 2305/00* (2013.01); *B29K 2307/04* (2013.01); *B29K 2309/02* (2013.01); *B29K 2309/08* (2013.01)

(58) Field of Classification Search
None
See application file for complete search history.

(56) References Cited

U.S. PATENT DOCUMENTS

| 4,260,265 A | 4/1981 | Faverty et al. |
| 6,159,408 A | 12/2000 | Kitayama et al. |

(Continued)

FOREIGN PATENT DOCUMENTS

| CA | 2886419 A1 * | 4/2014 | ......... B29C 45/1816 |
| DE | 102 14 654 A1 | 10/2003 | |

(Continued)

*Primary Examiner* — Jill L Heitbrink
(74) *Attorney, Agent, or Firm* — Sughrue Mion, PLLC (57) ABSTRACT

A production method of producing a fiber-reinforced resin molding includes: kneading, in a kneader, molten thermoplastic resin with opened reinforcing fibers obtained by opening a bundle of reinforcing fibers, to produce a kneaded mixture; and placing or charging the kneaded mixture into a molding device to produce a fiber-reinforced resin molding.

3 Claims, 7 Drawing Sheets

(51) Int. Cl.
*B29K 309/08* (2006.01)
*B29K 277/00* (2006.01)

(56) References Cited

U.S. PATENT DOCUMENTS

| | | | |
|---|---|---|---|
| 6,776,596 B2 | 8/2004 | Brüssel | |
| 2007/0007685 A1* | 1/2007 | Gleich | ............... B29C 47/6062 264/102 |
| 2012/0235090 A1 | 9/2012 | Maeda et al. | |
| 2015/0239158 A1 | 8/2015 | Heidemeyer et al. | |

FOREIGN PATENT DOCUMENTS

| | | |
|---|---|---|
| DE | 698 24 793 T2 | 6/2005 |
| DE | 10 2012 217 586 A1 | 3/2014 |
| JP | 55-11898 A | 1/1980 |
| JP | 5-220367 A | 8/1993 |
| JP | 2002-235257 A | 8/2002 |
| JP | 2010-180313 A | 8/2010 |
| JP | 2012-192678 A | 10/2012 |
| JP | 5553074 B2 | 6/2014 |
| JP | 2015-81262 A | 4/2015 |
| TW | 201249626 A1 | 12/2012 |
| WO | 2013/187220 A1 | 12/2013 |

\* cited by examiner

PRODUCTION METHOD OF PRODUCING FIBER-REINFORCED RESIN MOLDING

INCORPORATION BY REFERENCE

The disclosure of Japanese Patent Application No. 2014-195830 filed on Sep. 25, 2014 including the specification, drawings and abstract is incorporated herein by reference in its entirety.

BACKGROUND OF THE INVENTION

1. Field of the Invention

The invention relates to a production method of producing a fiber-reinforced resin molding by kneading a resin with reinforcing fibers and then placing or charging a kneaded mixture into a molding device.

2. Description of Related Art

Being lightweight and highly strong, fiber-reinforced resin moldings (fiber-reinforced plastics (FRP)), which are made of resins mixed with reinforcing fibers, are used in various industrial fields, such as the automobile industry, the construction industry, and the aviation industry.

For example, in the automobile industry, the fiber-reinforced resin moldings are applied to vehicular framework structural members, such as pillars, rockers, and lower floors, as well as to vehicular non-structural members, such as hood panels, which are required to present a fine appearance. This makes it possible to reduce the weight of vehicles while ensuring the sufficient strength of the vehicles, thereby contributing to the attempts to produce fuel-efficient and eco-friendly vehicles.

There is a wide variety of production methods of producing fiber-reinforced resin moldings described above. In one of the production methods, a kneader, such as a twin-screw extruder, is used. According to this method, first, resin pellets are fed into a resin melting zone of the kneader, where the resin pellets are melted, and then the molten resin is extruded from the resin melting zone. Then, bundles of reinforcing fibers are fed into a kneading zone of the kneader, where the molten resin is kneaded with the reinforcing fibers to produce a kneaded mixture. Then, the kneaded mixture is placed or charged into a molding device. In this way, a fiber-reinforced resin molding is produced.

Examples of reinforcing fibers to be fed into a kneader include carbon fibers and glass fibers. From the viewpoint of the ease of handling and the production efficiency, a roving, which is a bundle of, for example, 12K (12000), 24K (24000), or 50K (50000) fibers (monofilaments) bound together with a binder, is fed, as it is, into a kneader, cut in the kneader, and then kneaded with molten resin to produce a kneaded mixture.

U.S. Pat. No. 6,776,596 describes a fiber-reinforced resin production apparatus in which a resin (thermoplastic resin) and a roving of reinforcing fibers are fed into a twin-screw extruder, and the roving of reinforcing fibers is kneaded with the thermoplastic resin while the reinforcing fibers are cut due to the rotation of screws of the twin-screw extruder, whereby a kneaded mixture is produced.

As described above, a kneaded mixture for a fiber-reinforced resin molding is produced by feeding bundles of reinforcing fibers into a kneader. In this way, the reinforcing fibers, which are easy to handle, need not be subjected to any process. As a result, the production efficiency improves. However, the reinforcing fibers are bound together into bundles, and thus the external force applied from the kneader to the bundles of fibers significantly varies between an inner portion and an outer portion of each bundle. As a result, the fiber lengths of the reinforcing fibers after being broken in the kneader exhibit a wide distribution (wide range of variations). The fiber lengths are widely distributed (vary within a wide range), for example, from a length of 1 mm or shorter to a length of 25 mm or longer. A fiber-reinforced resin molding made of a kneaded mixture containing reinforcing fibers having a wide length distribution has physical property variations, and thus becomes an inferior-quality molding having strength variations.

SUMMARY OF THE INVENTION

The invention provides a production method of producing a fiber-reinforced resin molding by kneading a resin with reinforcing fibers and then placing or charging a kneaded mixture into a molding device, the production method enabling the production of a fiber-reinforced resin molding having a narrower range of physical property variations.

An aspect of the invention relates to a production method of producing a fiber-reinforced resin molding. The production method includes: kneading, in a kneader, molten thermoplastic resin with opened reinforcing fibers obtained by opening a bundle of reinforcing fibers, to produce a kneaded mixture; and placing or charging the kneaded mixture into a molding device to produce a fiber-reinforced resin molding.

In the production method according to the invention, the kneaded mixture is produced by feeding the opened reinforcing fibers, which are obtained by opening bundles of reinforcing fibers, into the kneader, instead of by feeding a bundle of reinforcing fibers, that is, a roving of reinforcing fibers, into the kneader. Because the opened reinforcing fibers are fed into the kneader, the external force (cutting force) applied from the kneader to the opened reinforcing fibers becomes as uniform as possible, so that the fiber lengths of the reinforcing fibers after cutting become as uniform as possible. As a result, the kneaded mixture containing the reinforcing fibers having a narrower fiber length distribution is obtained. Therefore, it is possible to produce a fiber-reinforced resin molding having a narrower range of physical property variations. Note that "opening fibers" means a step of turning bundles of reinforcing fibers into a continuous and wide thin form. Because the number of fibers present in the thickness direction is reduced by opening the fibers, the bundles of fibers are impregnated with a resin easily and uniformly.

In this case, for example, a twin-screw kneader (kneading extruder) with screws incorporated therein may be used as the kneader.

There are various methods for opening bundles of reinforcing fibers. Examples of the opening methods include a method of squeezing bundles of fibers with a round bar, a method of separating fibers by exposing the fibers to a stream of water or a high-pressure airflow, and a method of separating fibers by vibrating the fibers with ultrasonic vibrations. However, it is preferable to use an opening device equipped with an opening roller, from the viewpoints of the production efficiency and high-accuracy control of the opening width and the opening thickness.

Examples of the thermoplastic resin to be used include crystalline plastics such as polyolefin resins including polypropylene (PP), and nylon (PA), and amorphous plastics such as polycarbonate (PC) and thermoplastic epoxy.

Examples of the reinforcing fibers to be used include single-material fibers composed of any one of the following kinds of fibers and mixed-material fibers composed of two or more of the following kinds of fibers: inorganic fibers such as glass fibers and carbon fibers; ceramic fibers; metal fibers; and organic fibers.

Various molding methods including press molding, injection molding, and injection compression molding may be employed as the molding method of molding a kneaded mixture. Therefore, regarding "placing or charging the kneaded mixture into a molding device", the kneaded mixture is placed into a molding device when the kneaded mixture is subjected to press molding, while the kneaded mixture is charged into a molding device when the kneaded mixture is subjected to injection molding or the like.

In the production method according to the above aspect of the invention, cut reinforcing fibers may be obtained by cutting the opened reinforcing fibers, and the cut reinforcing fibers may be fed into the kneader to produce a kneaded mixture.

The cut reinforcing fibers are obtained by cutting the opened reinforcing fibers, and the cut reinforcing fibers are fed into the kneader. Thus, it is possible to make the fiber length distribution narrower, thereby producing the kneaded mixture containing the reinforcing fibers having a narrower fiber length distribution.

In the production method according to the above aspect of the invention, the kneader may be provided with a resin feed port that is located on an upstream side and through which thermoplastic resin is fed into the kneader, a fiber feed port that is located downstream of the resin feed port and through which the reinforcing fibers are fed into the kneader, and an extrusion port through which the kneaded mixture is extruded from the kneader. Further, the kneader may have, at least at a position between the resin feed port and the fiber feed port, a vent through which volatile gas generated from the molten thermoplastic resin is discharged from the kneader.

The reinforcing fibers (e.g., carbon fibers) that have been opened and cut may be considerably thin fibers having a diameter of approximately 6 to 7 µm. Thus, the feeding of the cut reinforcing fibers into the fiber feed port may be hindered by a flow of volatile gas generated from the thermoplastic resin.

To prevent this problem, the vent, through which volatile gas generated from the molten thermoplastic resin is discharged from the kneader, is provided at a position between the resin feed port and the fiber feed port. As a result, the cut reinforcing fibers are efficiently supplied to the fiber feed port located downstream of the vent.

Note that, "the kneader has, at least at a position between the resin feed port and the fiber feed port, a vent through which volatile gas generated from the molten thermoplastic resin is discharged from the kneader" includes not only a configuration in which the vent is provided between the resin feed port and the fiber feed port, but also other configurations such as a configuration in which, in addition to the above vent, there is another vent provided downstream of the fiber feed port.

In the production method according to the above aspect of the invention, the kneader may be provided with a feed assist mechanism that assists feeding of the cut reinforcing fibers into a fiber feed port through which the reinforcing fibers are fed into the kneader. The feed assist mechanism may be a suction unit or an airflow generator that generates an airflow headed toward the fiber feed port, the airflow generator being disposed near the fiber feed port.

Providing the vent at least at a position upstream of the fiber feed port prevents the problem that the feeding of the cut reinforcing fibers into the fiber feed port is hindered by a flow of volatile gas generated from the thermoplastic resin. In the above configuration, the feed assist mechanism is provided at or near the kneader in order to assist feeding of the cut reinforcing fibers into the fiber feed port.

The feed assist mechanism may be the suction unit provided near the fiber feed port of the kneader. In this case, the cut reinforcing fibers are suctioned by the suction unit to be introduced into the fiber feed port. Alternatively, the feed assist mechanism may be the airflow generator, such as a blower, provided near the fiber feed port. In this case, the cut reinforcing fibers are introduced into the fiber feed port by an airflow generated by the airflow generator.

As can be understood from the above description, according to the production method of producing a fiber-reinforced resin molding in the invention, the kneaded mixture is produced by feeding the opened reinforcing fibers into the kneader, and a fiber-reinforced resin molding is produced by placing or charging the kneaded mixture into the molding device. Thus, the external force (cutting force) applied from the kneader to the opened reinforcing fibers fed into the kneader becomes as uniform as possible over the entire region of opened reinforcing fibers, so that the fiber lengths of the reinforcing fibers after cutting become as uniform as possible. As a result, the kneaded mixture containing the reinforcing fibers having a narrower fiber length distribution is obtained. Therefore, it is possible to produce a fiber-reinforced resin molding having a narrower range of physical property variations.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, production methods of producing fiber-reinforced resin moldings according to first and second embodiments of the invention will be described with reference to the accompanying drawings. A press molding device is used as a molding device in the production method illustrated in the drawings. However, molding methods other than press molding, for example, injection molding and injection compression molding may also be employed to mold a kneaded mixture. When the molding methods other than press molding are employed, molding devices (molding devices) suitable for these molding methods are used. In the production method illustrated in the drawings, a kneaded mixture extruded from a kneader is conveyed to the molding device by a robotic hand. However, it goes without saying that a kneaded mixture may be conveyed to the molding device, for example, by a roller conveyer that extends from the kneader to the molding device, or may be conveyed manually to the molding device.

Figure 1:
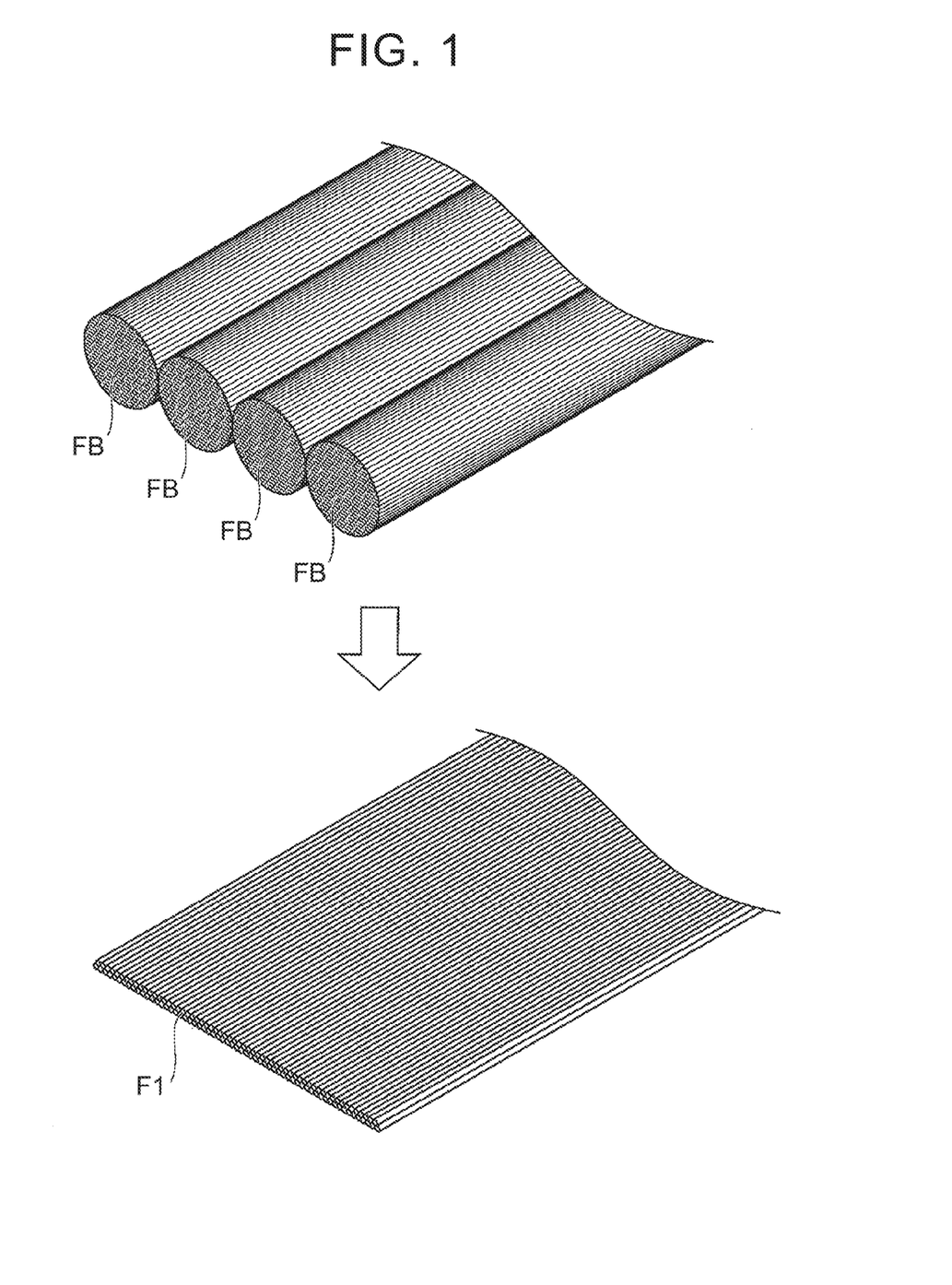
FIG. 1 is a schematic view illustrating a process of opening bundles of reinforcing fibers to obtain opened reinforcing fibers.
Figure 2A:
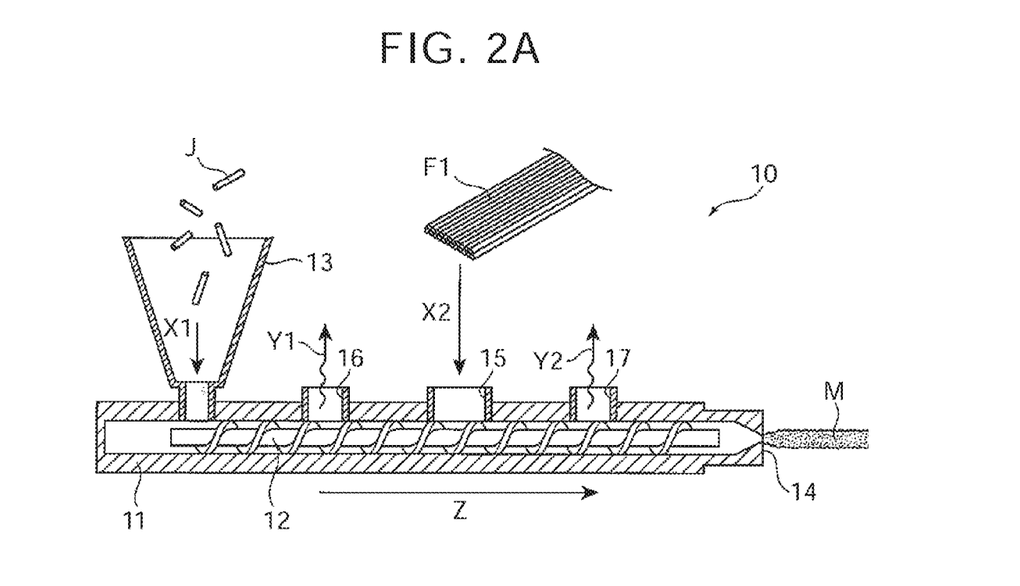
FIG. 2A and FIG. 2B are schematic views illustrating a production method of producing a fiber-reinforced resin molding according to a first embodiment of the invention, in which the opened reinforcing fibers are used.
Figure 2B:
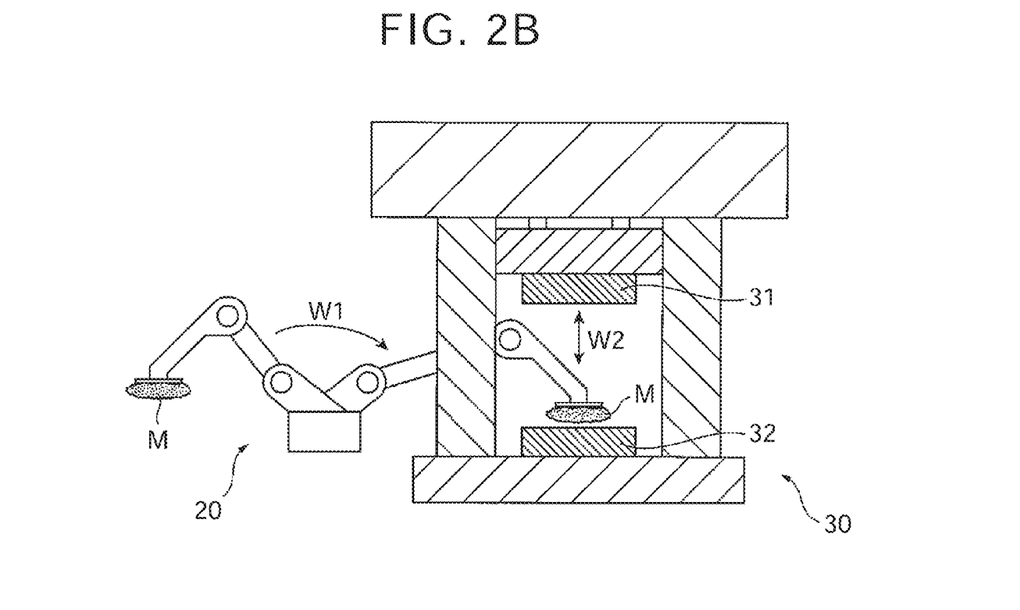

Hereafter, the production method of producing a fiber-reinforced resin molding according to the first embodiment of the invention will be described. FIG. 1 is a schematic view illustrating a process of opening bundles of reinforcing fibers to obtain opened reinforcing fibers. FIG. 2A and FIG. 2B are schematic views illustrating the production method of producing a fiber-reinforced resin molding according to the first embodiment of the invention, in which the opened reinforcing fibers are used.

First, as illustrated in FIG. 1, reinforcing fiber bundles FB are opened by an opening device (not illustrated) to obtain opened reinforcing fibers F1 having a prescribed opening width and a prescribed opening thickness.

Examples of the reinforcing fibers used in this case include single-material fibers composed of any one of the following kinds of fibers and mixed-material fibers composed of two or more of the following kinds of fibers: ceramic fibers made of boron, alumina, silicon carbide, silicon nitride, or zirconia; glass fibers; carbon fibers (both polyacrylonitrile (PAN)-based carbon fibers and pitch-based carbon fibers may be applicable); metal fibers made of copper, steel, aluminum, or stainless steel; and organic fibers made of polyamide or polyester.

Next, a kneaded mixture M of a thermoplastic resin and reinforcing fibers is produced by a kneader 10 illustrated in FIG. 2A. The kneader 10 illustrated in FIG. 2A includes a screw 12 incorporated in a main body 11 of the kneader 10. Further, the kneader 10 is provided with a resin feed port (hopper) 13 located on the most upstream side, and an extrusion port 14 located on the most downstream side.

Two vents 16, 17 are provided at positions downstream of the resin feed port 13. The volatile gas generated from the molten thermoplastic resin is discharged from the main body 11 through the vents 16, 17 along gas discharging directions Y1, Y2, respectively. Further, a fiber feed port 15 is provided at a position between the vents 16, 17. Resin pellets J made of a thermoplastic resin are fed into the resin feed port 13 along a direction X1.

In this case, either crystalline plastics or amorphous plastics may be used as the thermoplastic resin. Examples of crystalline plastics include polyethylene (PE), polypropylene (PP), nylon (PA: nylon 6, nylon 66, etc.), polyacetal (POM), and polyethylene terephthalate (PET). Examples of amorphous plastics include polystyrene (PS), polycarbonate (PC), polymethylmethacrylate (PMMA), ABS resin, and thermoplastic epoxy.

The resin pellets J fed from the resin feed port 13 are heated and melted in the main body 11, and delivered downstream along a direction Z while being kneaded by the screw 12.

As described above, volatile gas is generated from the molten thermoplastic resin. However, the volatile gas is discharged through the vents 16, 17 along the direction Y1 and the direction Y2. This prevents a problem that a supply of the opened reinforcing fibers F1 into the fiber feed port 15 is hindered by an upward flow of the volatile gas.

The opened reinforcing fibers F1 fed through the fiber feed port 15 along a direction X2 are cut by the screw 12, kneaded with the molten thermoplastic resin, and extruded to the extrusion port 14. Then, the kneaded mixture M is obtained through the extrusion port 14.

Next, as illustrated in FIG. 2B, the kneaded mixture M extruded through the extrusion port 14 is held by a robotic hand 20 disposed next to the extrusion port 14 of the kneader 10. Then, the kneaded mixture M is conveyed along a direction W1 to a molding device 30 disposed next to the robotic hand 20.

The molding device 30 is a press molding device. In the molding device 30, the kneaded mixture M is placed on a lower mold 32, which is a component of the molding device 30, and a punch 31 is moved downward along a direction W2 onto the kneaded mixture M to press the kneaded mixture M. In this way, a fiber-reinforced resin molding having a desired shape is produced.

According to the production method in the first embodiment illustrated in FIG. 2A and FIG. 2B, the kneaded mixture M is produced by feeding the opened reinforcing fibers F1 into the kneader 10, and a fiber-reinforced resin molding is produced by placing the kneaded mixture M in the molding device 30. Thus, the external force (cutting force) applied from the kneader 10 to the opened reinforcing fibers F1 fed into the kneader 10 becomes as uniform as possible over the entire region of opened reinforcing fibers F1, so that the fiber lengths of the reinforcing fibers after cutting become as uniform as possible. As a result, the kneaded mixture M containing the reinforcing fibers having a narrower fiber length distribution is obtained. Therefore, it is possible to produce a high-quality fiber-reinforced resin molding with a narrower range of physical property variations.

Figure 3A:
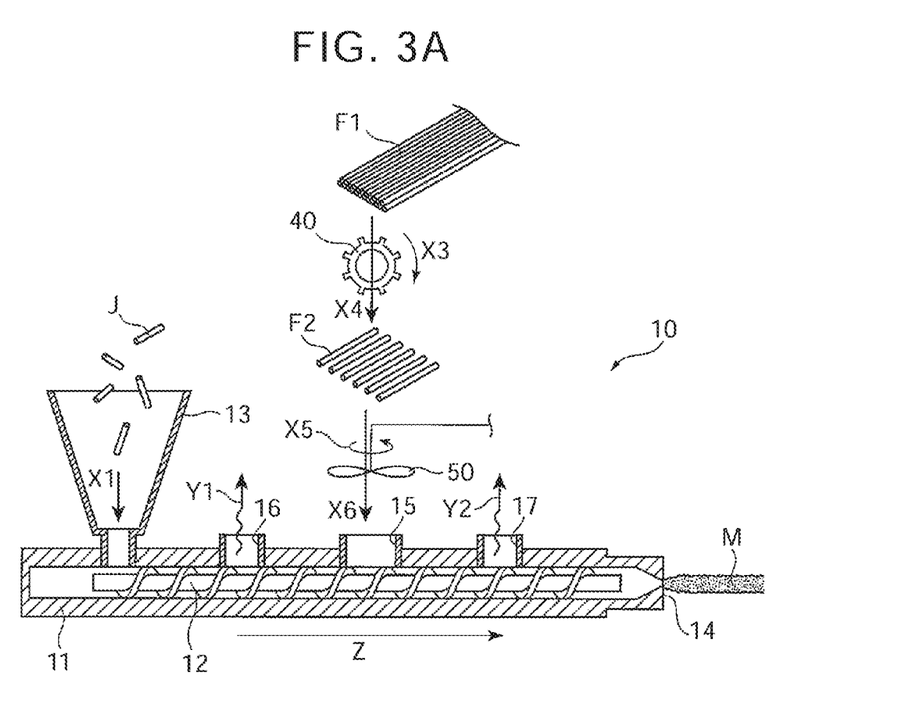
FIG. 3A and FIG. 3B are schematic views illustrating a production method of producing a fiber-reinforced resin molding according to a second embodiment of the invention, in which cut reinforcing fibers are used.
Figure 3B:
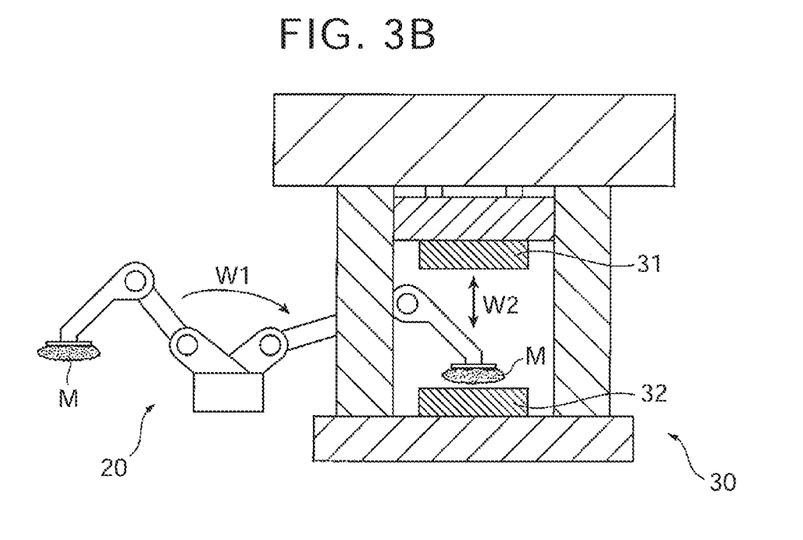

Hereafter, the production method of producing a fiber-reinforced resin molding according to the second embodiment of the invention will be described. FIG. 3A and FIG. 3B are schematic views illustrating the production method of producing a fiber-reinforced resin molding according to the second embodiment of the invention, in which cut opened reinforcing fibers are used.

In the production method according to the second embodiment, an airflow generator 50 is disposed above the fiber feed port 15 of the kneader 10. The airflow generator 50 is a fan, and serves as a feed assist mechanism that assists the introduction of the reinforcing fibers into the fiber feed port 15. Further, a cutter 40 is disposed above the airflow generator 50. The cutter 40 cuts the opened reinforcing fibers F1.

As the opened reinforcing fibers F1 pass along a direction X4 through the cutter 40 that is rotating along a direction X3, cut reinforcing fibers F2 having fiber lengths as uniform as possible are obtained. Then, the cut reinforcing fibers F2 thus obtained fall toward the fiber feed port 15.

Figure 3C:
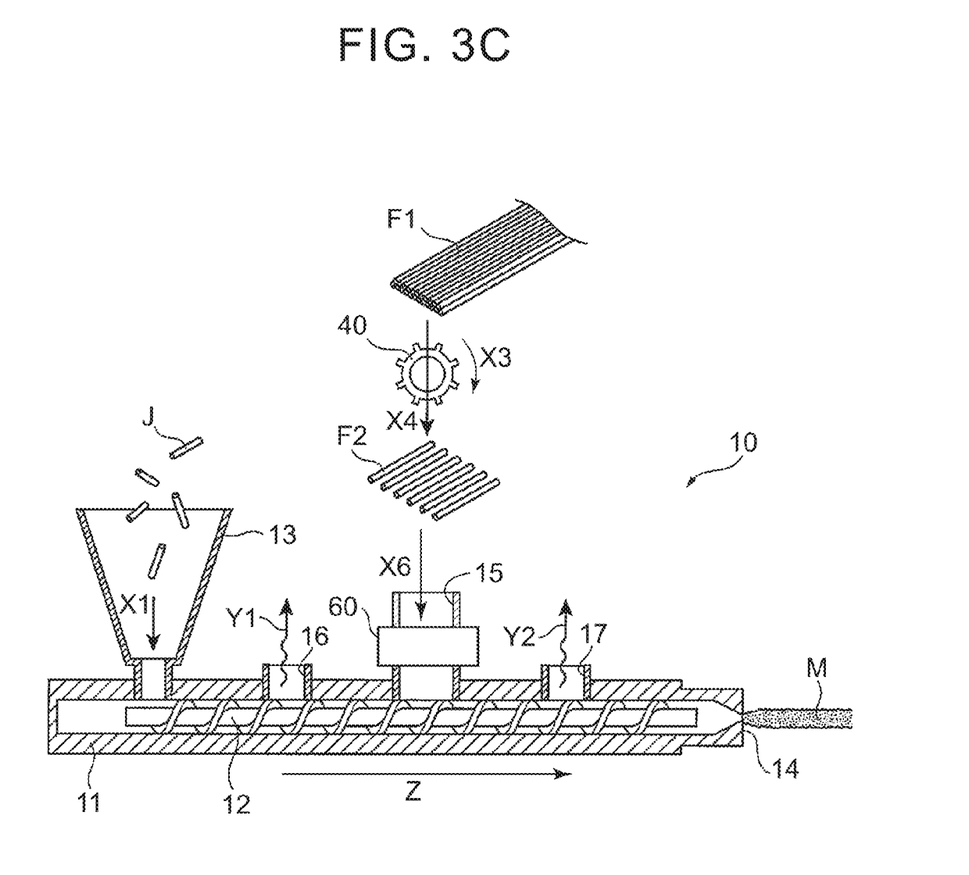
FIG. 3C is a view illustrating a modified example of the second embodiment of the invention.

The airflow generator 50, which is a fan, is disposed below the cutter 40, as the feed assist mechanism that assists the introduction of the cut reinforcing fibers F2 into the fiber feed port 15. Thus, the rotation of the airflow generator 50 along a direction X5 generates an airflow heading toward the fiber feed port 15, and the airflow effectively introduces the cut reinforcing fibers F2 into the fiber feed port 15 along a direction X6. Instead of being introduced into the fiber feed port 15 by an airflow generated by the airflow generator 50, the cut reinforcing fibers F2 may be introduced into the fiber feed port 15 in the following manner. As illustrated in FIG. 3C, a suction unit 60 is provided near the fiber feed port 15, and the cut reinforcing fibers F2 are suctioned by the suction unit 60 to be introduced into the kneader 10.

As described above, the cut reinforcing fibers F2 are obtained by cutting the opened reinforcing fibers F1, and the cut reinforcing fibers F2 are fed into the kneader 10. Thus, it is possible to make the fiber length distribution narrower, thereby producing the kneaded mixture M containing the reinforcing fibers having a narrower fiber length distribution.

As in the production method according to the first embodiment, the kneaded mixture M thus produced is conveyed by the robotic hand 20 to the molding device 30. In the molding device 30, press molding is performed to produce a fiber-reinforced resin molding.

According to the production method in the second embodiment illustrated in FIG. 3A and FIG. 3B, the kneaded mixture M is produced by cutting the opened reinforcing fibers F1 into the cut reinforcing fibers F2 having a uniform fiber length and feeding the cut reinforcing fibers F2 into the kneader 10, and a fiber-reinforced resin molding is produced from the kneaded mixture M. Thus, it is possible to produce a higher-quality fiber-reinforced resin molding having a narrower range of physical property variations as compared to a fiber-reinforced resin molding produced by the production method according to the first embodiment.

Hereafter, description will be provided on experiments regarding a fiber length distribution of the reinforcing fibers contained in prototyped fiber-reinforced resin moldings and experiments regarding a bending strength in the prototypes, and results of the experiments. The present inventor et al. produced a fiber-reinforced resin molding by a conventional production method (comparative example) and also produced a fiber-reinforced resin molding by the production method according to the invention (example). Then, the present inventor et al. extracted reinforcing fibers from each of the fiber-reinforced resin moldings produced by these production methods, measured the mass % of the reinforcing fibers in each fiber length range to verify the difference in fiber length distribution between the fiber-reinforced resin molding in the example and the fiber-reinforced resin molding in the comparative example. Further, the present inventor et al. cut a plurality of test pieces out from the fiber-reinforced resin moldings in the example and the comparative example, carried out bending tests to measure the bending strength and the bending elastic modulus of each test piece and obtain the standard deviations, thereby verifying the difference in strength variations between the fiber-reinforced resin molding in the example and the fiber-reinforced resin molding in the comparative example.

In this case, "conventional production method" means a method in which a kneaded mixture is produced by feeding bundles of reinforcing fibers into a kneader without opening the fibers and kneading the reinforcing fibers with molten thermoplastic resin, and then a fiber-reinforced resin molding is produced by subjecting the kneaded mixture thus produced to press molding. Further, "production method according to the invention" means a method in which opened reinforcing fibers are obtained by opening bundles of reinforcing fibers, a kneaded mixture is produced by feeding the opened reinforcing fibers into a kneader and kneading the opened reinforcing fibers with molten thermoplastic resin, and then a fiber-reinforced resin molding is produced by subjecting the produced kneaded mixture to press molding.

Figure 4:
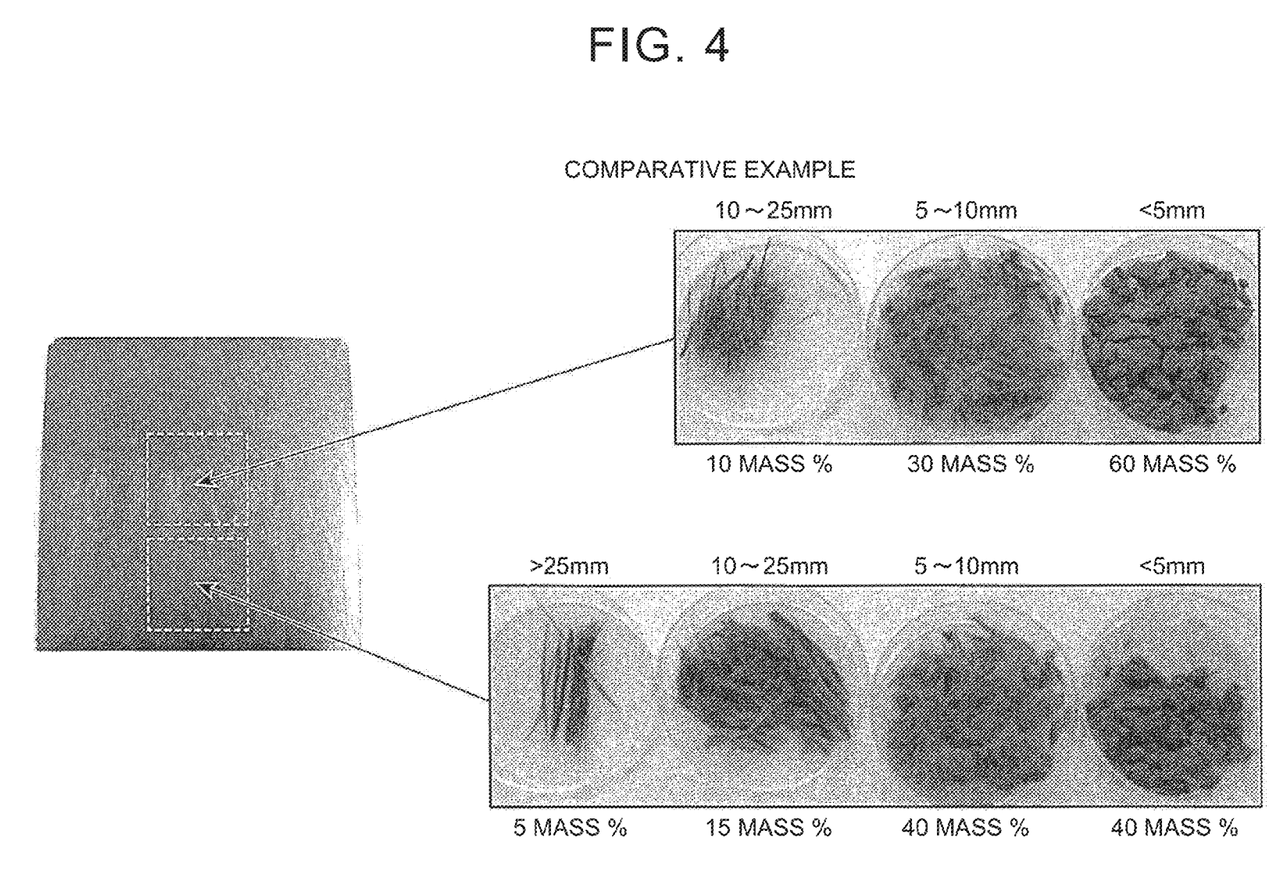
FIG. 4 is a photographic chart illustrating reinforcing fibers sampled from a fiber-reinforced resin molding produced by a conventional production method.
Figure 5:
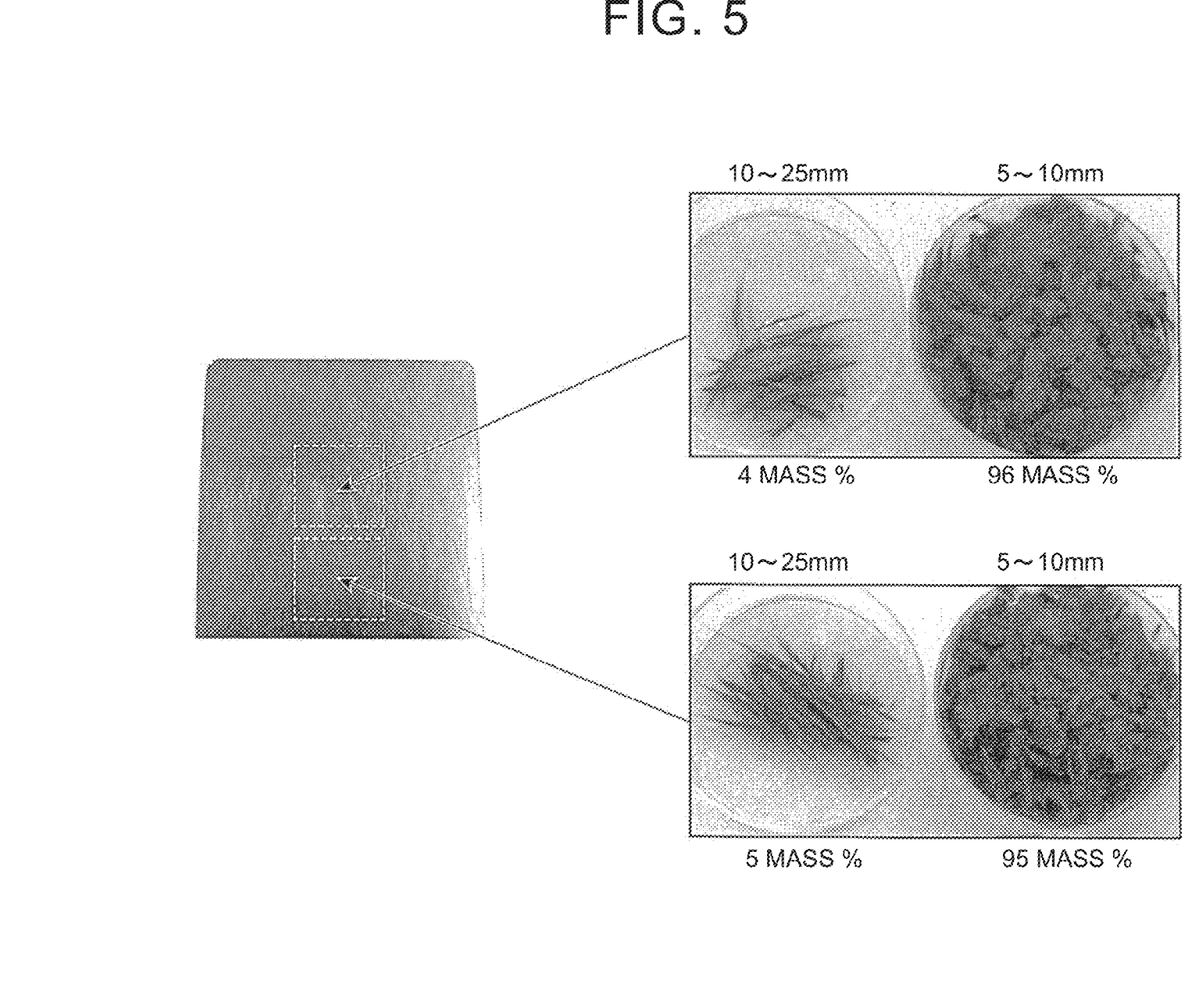
FIG. 5 is a photographic chart illustrating reinforcing fibers sampled from a fiber-reinforced resin molding produced by the production method according to the invention.

FIG. 4 is a photographic chart illustrating the reinforcing fibers sampled from the fiber-reinforced resin molding produced by the conventional production method. FIG. 5 is a photographic chart illustrating the reinforcing fibers sampled from the fiber-reinforced resin molding produced by the production method according to the invention.

As can be seen from FIG. 4, the reinforcing fibers in the fiber-reinforced resin molding produced by the conventional production method have a wide fiber length distribution. Specifically, the fiber-reinforced resin molding produced by the conventional production method contains various lengths of reinforcing fibers such as reinforcing fibers shorter than 5 mm and reinforcing fibers longer than 25 mm.

In contrast to this, as can be seen from FIG. 5, the reinforcing fibers in the fiber-reinforced resin molding produced by the production method according to the invention have a considerably narrow fiber length distribution. Specifically, the fiber-reinforced resin molding produced by the production method according to the invention contains neither reinforcing fibers shorter than 5 mm nor reinforcing fibers longer than 25 mm, and the reinforcing fibers having a fiber length of 5 to 10 mm account for 95 mass % or more of the entirety of the reinforcing fibers.

Figure 6A:
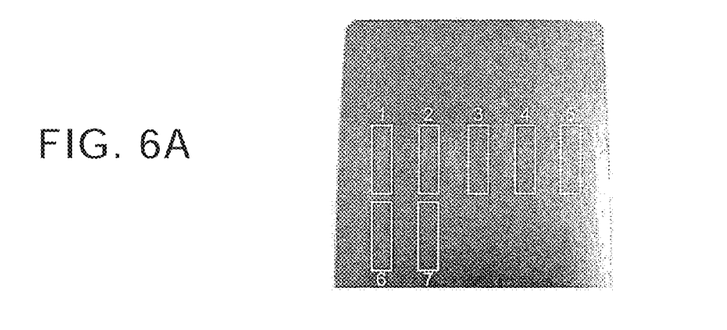
FIG. 6A is a photographic chart illustrating locations of a fiber-reinforced resin molding, from which bending test pieces are cut out.
Figure 6B:
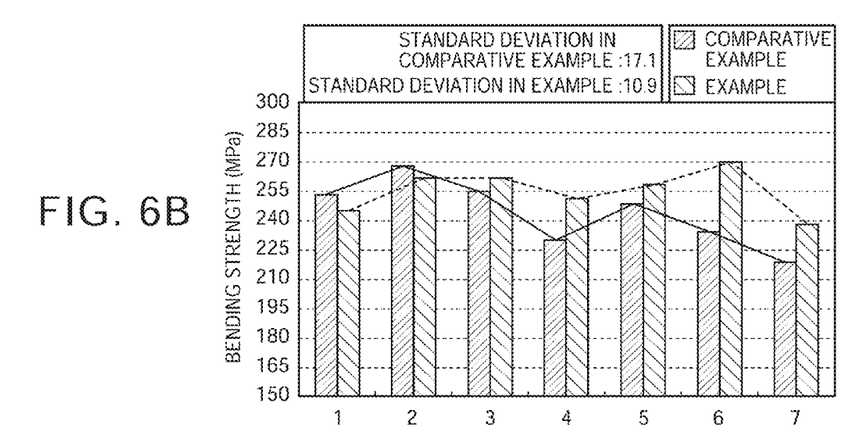
FIG. 6B is a graph illustrating the bending strength of each test piece detected in a bending test and a standard deviation in bending strength of the test pieces in each of an example according to the invention and a comparative example.
Figure 6C:
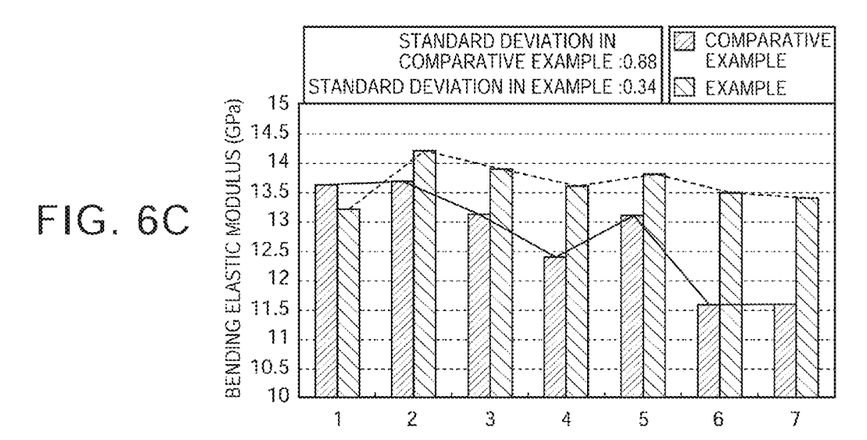
FIG. 6C is a graph illustrating the bending elastic modulus of each test piece detected in the bending test and a standard deviation in bending elastic modulus of the test pieces in each of the example and the comparative example.

FIG. 6A is a photographic chart illustrating locations of a fiber-reinforced resin molding, from which bending test pieces are cut out. FIG. 6B is a graph illustrating the bending strength of each test piece detected in a bending test and a standard deviation in bending strength of the test pieces in each of the example and the comparative example. FIG. 6C is a graph illustrating the bending elastic modulus of each test piece detected in the bending test and a standard deviation in bending elastic modulus of the test pieces in each of the example and the comparative example.

In the prototyped fiber-reinforced resin moldings, PA6 was used as the thermoplastic resin and reinforcing fibers made of carbon fibers were used. In the test pieces in the comparative example, bundles of unopened reinforcing fibers (in a size of 50K (50000 fibers per bundle)) were used. In each of the comparative example and the example, seven test pieces, 80 mm long by 15 mm wide, were cut out from the fiber-reinforced resin moldings in the form of a flat plate (400 mm×400 mm×4 mm thick), and the bending strengths were evaluated.

As can be seen from FIG. 6B and FIG. 6C, the bending strength and bending elastic modulus of the test pieces in the example are both higher than those of the test pieces in the comparative example. Moreover, the standard deviations in bending strength and bending elastic modulus of the test pieces in the example are significantly smaller than those of the test pieces in the comparative example (the standard deviations in bending strength and bending elastic modulus of the test pieces in the example are about 60% and about 40%, respectively, of those of the test pieces in the comparative example). This means that the strength variations in the example are significantly smaller than those in the comparative example.

It is deemed that the increase in strength and the decrease in strength variations are attributed to the production method in which the fiber-reinforced resin molding was produced by kneading the thermoplastic resin with the opened reinforcing fibers obtained by opening the bundles of reinforcing fibers.

While the embodiments of the invention have been described in detail with reference to the accompanying drawings, the specific configurations of the invention are not limited to those in the foregoing embodiments, and configurations with design changes within the scope of the invention are included in the invention.

What is claimed is:

1. A production method of producing a fiber-reinforced resin molding, the production method comprising:
   opening a bundle of reinforcing fibers to obtain opened reinforcing fibers;
   cutting the opened reinforcing fibers, using a cutter, into cut reinforcing fibers having a predetermined length;
   feeding pellets of thermoplastic resin into a kneader via a resin feed port of the kneader;
   kneading and heating, in the kneader using a screw in the kneader, the pellets of thermoplastic resin into a molten thermoplastic resin;
   feeding the cut reinforcing fibers into the kneader via a fiber feed port that is located downstream of the resin feed port, wherein the fiber feed port is disposed below the cutter so that the cut reinforcing fibers fall toward the fiber feed port and a suction unit that is provided at the fiber feed port suctions the cut reinforcing fibers to introduce the cut reinforcing fibers into the kneader;
   kneading, in the kneader, the molten thermoplastic resin with the cut reinforcing fibers, to produce a kneaded mixture;
   conveying the kneaded mixture extruded from an extrusion port of the kneader to a mold by a robotic hand, and placing or charging the kneaded mixture into the mold; and
   pressing the kneaded mixture in the mold by a molding device to produce a fiber-reinforced resin molding.

2. The production method according to claim 1, wherein: the kneader has, at least at a position between the resin feed port and the fiber feed port, a vent through which volatile gas generated from the molten thermoplastic resin is discharged from the kneader.

3. The production method according to claim 1, wherein the predetermined length of at least 95% of the cut reinforcing fibers is 5 to 10 mm.

* * * * *